United States Patent Office 3,368,729
Patented Feb. 13, 1968

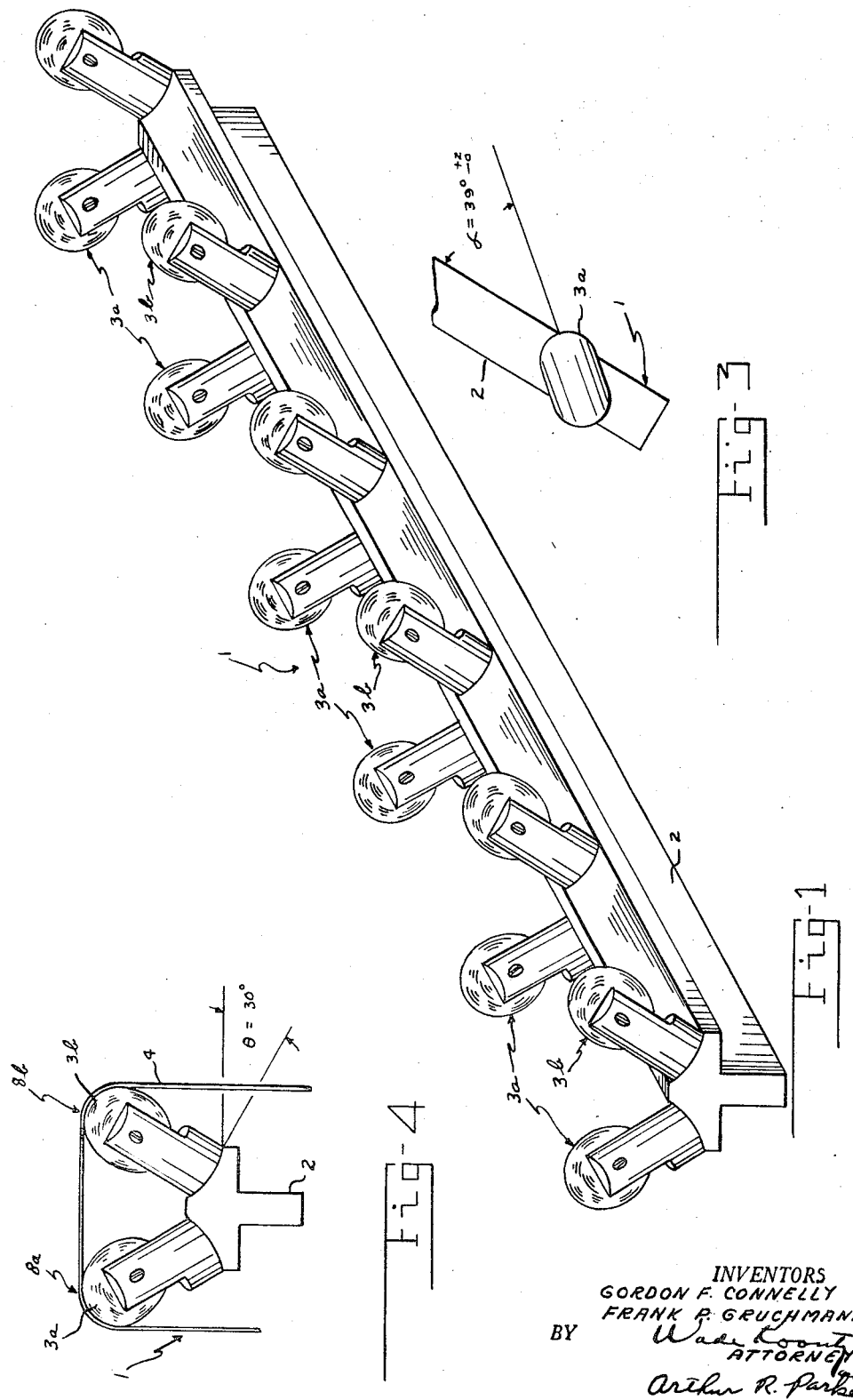

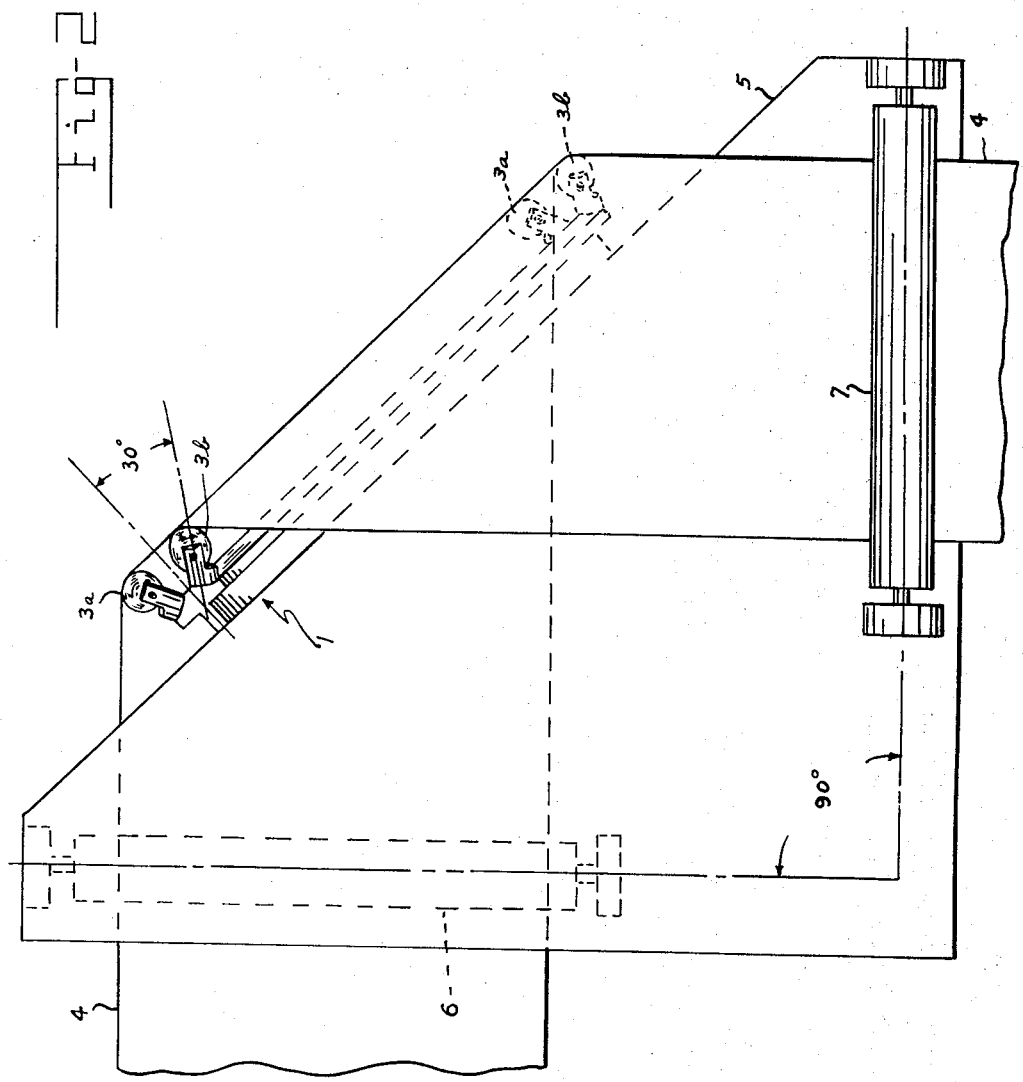

3,368,729
FILM TWISTER DEVICE
Gordon F. Connelly and Frank P. Gruchmann, Rochester, N.Y., assignors to the United States of America as represented by the Secretary of the Air Force
Filed Sept. 20, 1962, Ser. No. 225,175
1 Claim. (Cl. 226—197)

This invention relates generally to improved means for directing film in motion through a substantial change in direction and, more particularly, to a unique film twister device facilitating this movement of said film while the latter is assuming a new direction.

When film is ordinarily directed into a new direction by means of a rotating cylindrical element, some means is incorporated in the film mount for insuring that the film slides relative to the cylindrical element in order to maintain its relative position during such change in direction. With the usual arrangement, the aforesaid cylindrical element may be equipped with certain lateral moving surfaces which are supported by means of a relatively complex design of ball bearings and other supporting elements associated therewith. These lateral moving surfaces follow the lateral movement of the film as it assumes a new direction during contact therewith; however, generally such arrangements means unacceptably high friction losses, mistracking of the film and frequent damage to the film itself. The film twister of the present invention eliminates any requirement for the previously-described lateral moving surfaces and, instead, uses one or more rotatably mounted wheel elements for supporting the film during its assumption of a new direction in a manner to be hereinafter described in detail.

An object of the present invention, therefore, resides in the utilization of an improved, relatively reduced friction film twister device for transporting film in a new direction.

A further object of the invention provides a unique and improved film twister device incorporating a film supporting device of relatively few moving parts.

A still further object of the invention involves a novel film twister device for properly tracking film during its assumption of a new direction.

An additional object of the invention is in the utilization of a simplified film twister in which is incorporated a plurality of wheel-like film supporting elements for normally supporting the film during its transport into a relatively large change in direction.

Other objects and advantages of the invention will become apparent from the following description.

The attached drawing illustrates a preferred embodiment of the invention, in which FIG. 1 represents a top perspective view of the present invention, illustrating details of the inventive film twister device alone.

FIG. 2 is a second top view, partially in perspective and broken away, of the film twister device of FIG. 1 utilized with a section of film.

FIG. 3 represents a top view of a portion of the invention, illustrating the angled relationship between a single film-supporting wheel element utilized with the film twister device of FIGS. 1 and 2 and the longitudinal axis of its support element.

FIG. 4 is a schematic end view of the film twister device of FIGS. 1 and 2, partly schematic in form, of a corresponding pair of film-supporting wheel elements, illustrating the angular relationship therebetween with the film added thereto.

Referring to the drawings and particularly FIGS. 1 and 3, the film twister device of the present invention is indicated generally at 1 as including a stationary base element 2 and two parallel rows of ball-like wheel elements indicated at 3a and 3b, respectively. In the present embodiment, each row is illustrated as consisting of six film-supporting wheel elements; however, this number may be varied without departing from the true spirit or scope of the invention. The wheel elements of each row are equally spaced apart relative to each other and are positioned at a compound angle in a manner to be described in more detail hereinafter.

In FIG. 3, for example, it is illustrated that the previously-mentioned wheel elements, one of which is illustrated at 3a, are each set at an initial angle of approximately 39° relative to the longitudinal axis of the base element 2 (see angle α in FIG. 3). In addition, each of said wheel elements, a corresponding pair of which are illustrated at 3a and 3b in FIG. 4, is set at an angle of 30° (see angle θ in FIG. 4) relative to opposite sides of a bisector extending between said corresponding pair of wheel elements 3a, 3b. Thus, the combined angled relation of each wheel element 3a, 3b, as described above, constitutes the previously-mentioned "compound angle" at which each wheel element is mounted. It is this compound angled relation of each wheel element that constitutes a key feature of the invention since, with such angled relation, the least slippage is afforded to the film during its passage around the inventive film twister device. In connection therewith, it is noted that the previously-described 39° angle is oriented in the same direction (clockwise, as shown in FIG. 1, for example). In this manner, each row of wheel elements (3a or 3b) may represent a theoretical cylindrical diameter established to perform the required bending of the film as will be hereinafter explained in more detail with reference to FIG. 2 of the drawings.

Referring specifically to FIG. 2 of the drawings, there is illustrated a film roller supporting plate at 5 on which is mounted an entrance film roller 6 and an exit film roller 7 positioned in spaced relation and at right angles to said entrance film roller 6. Film is shown at 4 as being turned through an angle of 90°, after being initially directed by said entrance film roller 6 in one direction and subsequently directed by said exit film roller 7 in a new direction after being turned through a 90° angle by the inventive film twister device 1. The latter is interposed between entrance roller 6 and exit roller 7 and is positioned on supporting plate 5 at a 45° angle to each. Thus, the film twister device is positioned in the path of the initial direction of movement of film 4.

Each wheel element 3a, 3b incorporates a radius on the portion of the circumference thereof substantially adjacent the film-contacting surface, and the topmost point thereof constitutes the point of maximum outside diameter of each wheel. This point is indicated generally at 8a and 8b, respectively, for wheel element 3a and 3b (note FIG. 4). Thus, the angle at which the film twister device 1 of the invention is mounted relative to the initial direction of movement of the film 4 coupled with the specific compound angles (previously described) at which the wheel elements are mounted, necessitates that the film 4 approaches each of the first row of film-supporting wheel elements 3a (note FIG. 4) at a point of contact with the aforesaid radius somewhere below the point of maximum outside diameter 8a and disengages from its contact with each wheel 3a at a point on the circumference of said wheel element approximating the point of maximum outside diameter 8a or, in other words, at the top of said radius. In regard to the second row of wheel elements 3b, the film 4 approaches each of the second row of wheel elements 3b at a point of contact approximating the top of the radius or point of maximum outside diameter 8b and then finally disengages from its contact with each wheel element 3b at a point on the circumference of said wheel element somewhere below the point of maximum outside diameter. An important characteristic of the above-described arrangement involves the balancing out of relatively small slipping forces normally tending to occur between the film and each wheel element, thus cancelling, or substantially cancelling, any tendency of the film to deviate from normal tracking.

Thus, a new and improved film twister device has been developed by the present invention in which normal friction losses are substantially reduced, less film damage occurs and vibration is practically eliminated. Moreover, proper film tracking is assured and a simple and inexpensive facility is effected with a minimum of weight and high reliability.

We claim:

1. A film twister device comprising a right triangular film mounting plate, an entrance film roller positioned on one leg of said mounting plate, an exit film roller positioned on the other leg of said mounting plate in spaced relation to said entrance roller and at right angles thereto, the respective axes of said entrance and exit rollers being in the same plane, and means mounted on the hypotenuse of the mounting plate for handling film during transport thereof to a new direction at an angle to the original direction of movement, said means comprising a stationary base element having a longitudinal axis and located at an acute angle to the extended axes of said entrance and exit rollers, the axis of said stationary base element being in the same plane as that plane passing through the respective axes of the entrance and exit rollers, a double row of spaced film supporting elements mounted at an acute angle with respect to said longitudinal axis of said stationary base element.

References Cited

UNITED STATES PATENTS

| | | | |
|---|---|---|---|
| 2,949,992 | 8/1960 | Weinberg | 193—35 |
| 2,970,732 | 2/1961 | Lawrance | 226—196 |
| 3,045,791 | 7/1962 | Ayres | 193—35 |
| 3,078,977 | 2/1963 | Heinrich | 193—35 |

FOREIGN PATENTS 84,136    8/1935    Sweden.

SAMUEL FEINBERG, *Primary Examiner.*

SAMUEL W. ENGLE, *Examiner.*

R. F. STAHL, *Assistant Examiner.*